United States Patent [19]

Kashiwabara

[11] Patent Number: 5,669,847

[45] Date of Patent: Sep. 23, 1997

[54] CONTROL APPARATUS FOR VEHICLE

[75] Inventor: Masuo Kashiwabara, Atsugi, Japan

[73] Assignee: Unisia Jecs Corporation, Atsugi, Japan

[21] Appl. No.: 475,994

[22] Filed: Jun. 7, 1995

[30] Foreign Application Priority Data

Jun. 9, 1994 [JP] Japan ................................. 6-127519

[51] Int. Cl.$^6$ .............................. F16H 59/06; F16H 59/66
[52] U.S. Cl. .................... 477/46; 477/48; 477/120; 477/901
[58] Field of Search ............................. 477/45, 46, 48, 477/90, 91, 120, 901; 474/18, 28

[56] References Cited

U.S. PATENT DOCUMENTS

| 4,625,590 | 12/1986 | Muller ............................. 477/120 |
| 4,735,114 | 4/1988 | Satoh et al. ..................... 477/48 X |
| 4,945,483 | 7/1990 | Tokoro ............................ 477/48 X |
| 5,231,581 | 7/1993 | Takahashi et al. ............... 477/120 X |
| 5,319,555 | 6/1994 | Iwaki et al. ..................... 477/120 X |

FOREIGN PATENT DOCUMENTS

| 59-8698 | 2/1984 | Japan . |
| 61-220938 | 10/1986 | Japan . |
| 62-113956 | 5/1987 | Japan . |

Primary Examiner—Khoi Q. Ta
Attorney, Agent, or Firm—Foley & Lardner

[57] ABSTRACT

With the present invention, it is possible for a vehicle to run on an uphill road at substantially the same throttle opening as on a horizontal road.

When the road is uphill (hill-climbing resistance $R\theta>0$), a maximum acceleration Amax for a full throttle opening is obtained according to a vehicle speed, and a maximum driving force $Fmax=m \cdot Amax+RL$ is calculated based on the mass of the vehicle m and the rolling and air resistance RL of the vehicle. Then, a correction coefficient HOS is obtained according to a throttle opening to calculale a required driving force $Ftgt=Fmax \cdot HOS$. According to the required driving force Ftgt, hill-climbing resistance $R\theta$, and vehicle speed VSP, a target horsepower $Ptgt=(Ftgt+R\theta) \cdot VSP$ is calculated. To attain the target horsepower Ptgt, a target speed change ratio "itgt" for a continuously variable transmission is calculated to control the transmission.

6 Claims, 5 Drawing Sheets

CONTROL APPARATUS FOR VEHICLE

TECHNICAL FIELD

The present invention relates to a control apparatus for a vehicle, for improving the driveability of the vehicle to run uphill or downhill.

BACKGROUND ART

A technique of optimizing the speed change ratio of a transmission of a vehicle according to the slope of a road is disclosed in, for example, Japanese Examined Patent Publication No. 59-8698 (prior art 1), Japanese Unexamined Patent Publication No. 62-113956 (prior art 2), and Japanese Unexamined Patent Publication No. 61-220938 (prior art 3).

(1) The prior art 1 discloses a stepwise transmission for a vehicle wherein an expected acceleration on a horizontal road is stored for each gear position, vehicle velocity, and throttle opening, the stored acceleration is compared with an actual acceleration to determine whether the vehicle is running on a horizontal road or an uphill road, thereby changing transmission speed change maps based on the determined result.

(2) The prior art 2 discloses a continuously variable transmission (CVT) for a vehicle, wherein the slope of a road is calculated according to the torque, acceleration, etc., of the vehicle and the speed change ratio of the CVT is controlled based on the calculation result. More precisely, transmission speed change maps are changed according to the slope.

(3) The prior art 3 also discloses a CVT for a vehicle wherein the speed change ratio of the CVT is controlled according to a required output (throttle opening) and the slope of a road. More precisely, the speed change ratio of the CVT is controlled according to the product of a throttle opening and the slope of a road.

These prior arts, however, have the following problems:

(1) With the prior art 1, since the construction is such that transmission speed change maps are changed depending on the determination as to whether the road is horizontal or uphill, it is impossible to continuously change the speed of the vehicle according to the slope. The technique of the prior art 1 is incapable of fully exerting the capability of a CVT when it is applied thereto. The prior art 1 does not consider the equation of motion of a vehicle, and therefore, it is impossible to drive the vehicle on an uphill road at substantially the same throttle opening as on a horizontal road.

Moreover, it is unable to always achieve proper engine braking on a downhill road, and therefore, resulting in a frequent braking operation.

(2) With the prior art 2, although the slope of a road is calculated, transmission speed change maps are changed. Accordingly, it is impossible to continuously change the speed of the vehicle according to the slope. Namely, the technique of the prior art 2 is incapable of fully exerting the capability of a CVT. The prior art 2 does not consider the equation of motion of a vehicle, and therefere, involves the same problem mentioned above.

(3) With the prior art 3, the speed change ratio of a CVT is controlled according to the product of a throttle opening and the slope of a road. This product does not correctly correspond to the equation of motion of a vehicle, and therefore, must be verified for each vehicle and condition. This needs great labor, and therefore, it is practically impossible to drive a vehicle on an uphill road at substantially the same throttle opening as on a horizontal road, or always achieve proper engine braking on a downhill road.

To solve these problems, an object of the present invention is to provide a control apparatus for a vehicle, capable of driving the vehicle on an uphill road at substantially the same throttle opening as on a horizontal road, always achieving proper engine braking on a downhill road of even a large slope, and maintaining good driveability both on uphill and downhill roads.

DISCLOSURE OF THE INVENTION

In order to achieve the object, the present invention provides a control apparatus for a vehicle, comprising a unit (a) for calculating a first value related to the hill-climbing resistance of the vehicle, a unit (b) for calculating a second value related to an acceleration or a driving force to be produced, according to the driving conditions of the vehicle, a unit (c) for calculating a third value related to the speed of the vehicle, a unit (d) for calculating a target horsepower according to the first, second and third values, and a unit (e) for controlling the horsepower of the vehicle, to achieve the target horsepower.

The unit (e) for controlling the horsepower of the vehicle may control the quantity of intake air, an air-fuel ratio, etc., to get the target horsepower. The unit (e) also may control the speed change ratio of a transmission (in particular, a continuously variable transmission), to get the target horsepower.

The unit (b) for calculating the second value has a unit (b1) for calculating a maximum acceleration the vehicle can provide when the hill-climbing resistance thereof is substantially zero, and a unit (b2) for calculating a correction coefficient according to a parameter indicating an accelerator opening. According to at least the maximum acceleration and correction coefficient, the unit (b) calculates the second value.

In addition to the units (b1 and b2), the unit (b) for calculating the second value may have a unit (b3) for calculating an acceleration resistance based on the maximum acceleration and the mass of the vehicle, a unit (b4) for calculating the rolling and air resistance of the vehicle, and a unit (b5) for adding the acceleration resistance to the rolling and air resistance, to provide a maximum driving force. The unit (b) multiplies the maximum driving force by the correction coefficient, to provide the second value.

The unit (b1) may calculate the maximum acceleration according to the third value.

The unit (b) for calculating the second value may have a unit for determining whether the first value is positive or negative. If the first value is negative, the unit (b) may calculate the second value according to the third value.

The operation of the present invention will be explained.

The equation of motion of a vehicle is expressed as follows:

when the vehicle runs on a slope:

$$P = (m \cdot A + RL + m \cdot g \cdot \sin \theta) \cdot VSP$$

when the vehicle runs on a horizontal road ($\theta = 0$):

$$P = (m \cdot A + RL) \cdot VSP$$

where P is a horsepower, m is the mass of the vehicle, A is an acceleration, RL is the rolling and air resistance of the vehicle, g is the acceleration of gravity, θ is the slope of a road, and VSP is a vehicle speed.

To achieve the same acceleration on a slope as on a horizontal road, it is necessary to produce a horsepower of m·g·sinθ·VSP in addition to the horsepower that is required to run on a horizontal road.

According to the present invention, the first value (Rθ=m·g·sinθ related to the hill-climbing resistance of the vehicle is calculated, the second value related to an acceleration (A) or a driving force (F=m·A+RL) to be produced is calculated according to the driving conditions of the vehicle, and the third value (VSP) related to a vehicle speed is calculated. According to the first, second and third values, a target horsepower is calculated and the speed change ratio of a transmission (in particular, a continuously variable transmission) of the vehicle is controlled, to achieve the target horsepower.

According to the first to third values, i.e., the hill-climbing resistance Rθ=m·g·sinθ, a required acceleration Atgt, and the vehicle speed VSP, the target horsepower Ptgt is calculated as follows:

$$Ptgt=(m·Atgt+RL+Rθ)·VSP$$

The speed change ratio is controlled, to achieve the target horsepower Ptgt.

The first to third values may be the hill climbing resistance Rθ=m·g·sinθ, a required driving force Ftgt, and the vehicle speed VSP, to obtain the target horsepower Ptgt as follows:

$$Ptgt=(Ftgt+Rθ)·VSP$$

The speed change ratio is controlled, to achieve the target horsepower Ptgt.

To calculate the second value (in particular, the required acceleration Atgt) related to an acceleration or a driving force to be produced by the vehicle on a horizontal road, it is necessary to calculate a maximum acceleration Amax the vehicle can produce when the hill-climbing resistance thereof is substantially zero, namely, the maximum acceleration Amax when an accelerator is fully opened, that is, a throttle is fully opened. The maximum acceleration Amax is calculable from the third value, i.e., the vehicle speed VSP. Based on a parameter such as a throttle opening corresponding to an accelerator opening, a correction coefficient HOS is calculated, and using at least the maximum acceleration Amax and correction coefficient HOS, the second value, i.e., the required acceleration Atgt=Amax·HOS, is calculated.

To calculate the second value (in particular, the required driving force Ftgt) related to an acceleration or a driving force to be produced on a horizontal road, it is necessary to calculate the maximum acceleration Amax the vehicle can achieve when the hill-climbing resistance thereof is substantially zero, namely, the maximum acceleration Amax when the accelerator is fully opened, that is, the throttle is fully opened. The maximum acceleration Amax is calculable according to the third value, i.e., the vehicle speed VSP. An acceleration resistance (m·Amax) is calculated according to the maximum acceleration Amax and the mass "m" of vehicle, the rolling and air resistance RL of the vehicle is calculated, and the acceleration resistance and the rolling and air resistance are added to provide a maximum driving force Fmax=m·Amax+RL. The correction coefficient HOS is calculated based on a parameter such as a throttle opening corresponding to an accelerator opening, and the maximum driving force Fmax is multiplied by the correction coefficient HOS, to provide the second value, i.e., the required driving force Ftgt=Fmax·HOS.

On a downhill road, however, the second value, i.e., the required acceleration is calculated at nearly zero based on the vehicle speed VSP, to always realize proper engine braking even if the slope of the down hill road is large.

In this way, with the present invention, it is possible to drive a vehicle on an uphill road at the same throttle opening as on a horizontal road, thereby always achieving proper engine braking on a downhill road, and improving driveability.

The quantity of intake air or an air-fuel ratio may be controlled to attain a target horsepower. It is easy, however, by controlling the speed change ratio of a transmission (in particular, a continuously variable transmission), to attain the target horsepower.

With the present invention, by calculating the second value related to an acceleration or a driving force (in particular, a required acceleration) to be produced by a vehicle on a horizontal road according to a maximum acceleration the vehicle can produce when the hill-climbing resistance thereof is nearly zero, as well as a correction coefficient based on a parameter indicating an accelerator opening, thereby simply and correctly calculating the required acceleration.

Moreover, with the present invention, by calculating the second value related to an acceleration or a driving force (in particular, a required driving force) to be produced by a vehicle on a horizontal road according to a maximum acceleration the vehicle can produce when the hill-climbing resistance thereof is substantially zero, as well as a correction coefficient based on a parameter indicating an accelerator opening, thereby simply and correctly calculating the required drive force.

The maximum acceleration may simply and correctly be calculated based on the third value, i.e., the vehicle speed.

On a downhill road, by calculating the second value, i.e., a required acceleration based on the third value, i.e., a vehicle speed, thereby always realizing proper engine braking even if the downhill road is steep.

Constructions, operations and effects characteristic to the present invention will be clarified through embodiments and drawings.

BEST MODE FOR CARRYING OUT THE INVENTION

Figure 1:
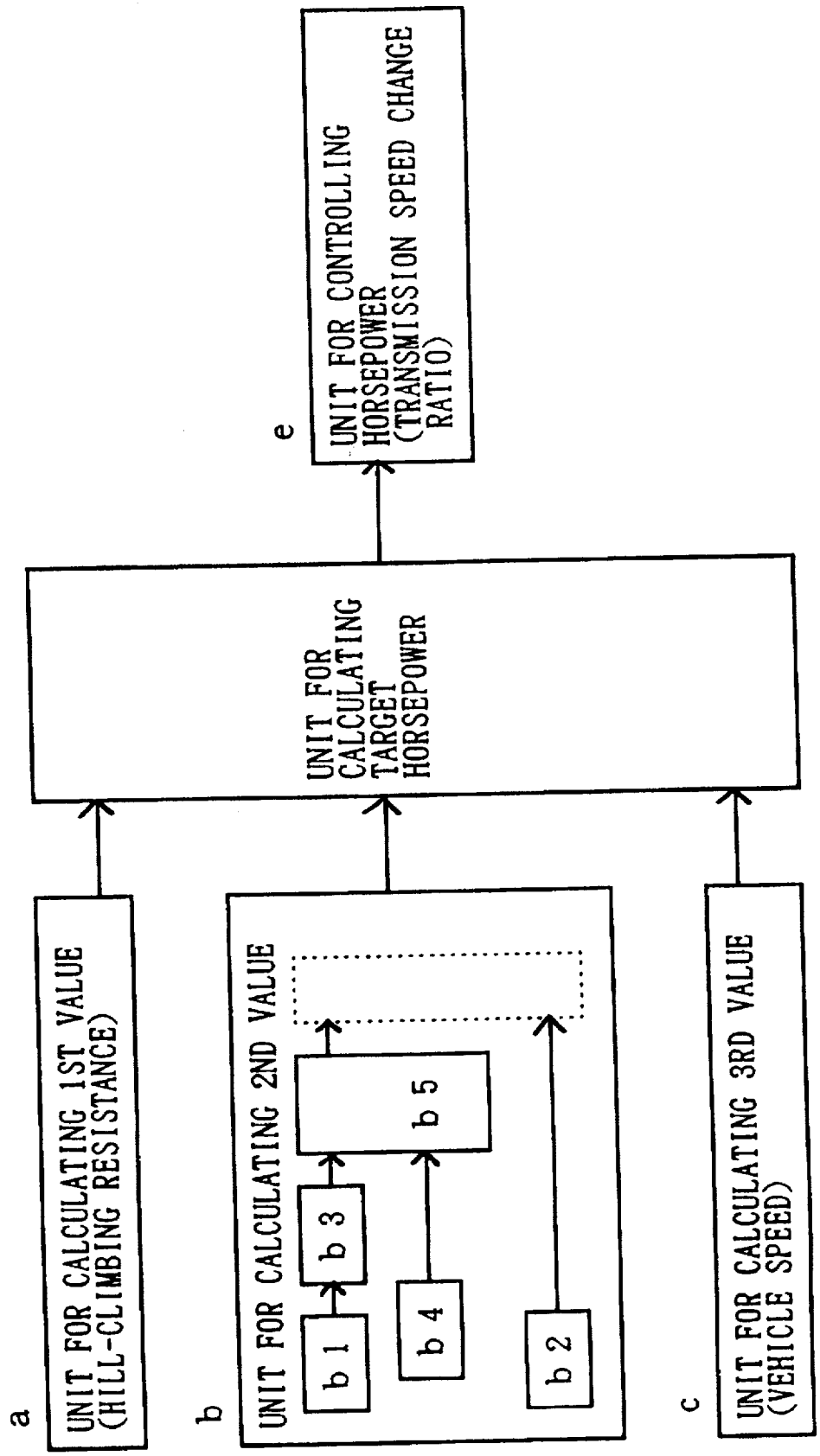
FIG. 1 is a block diagram showing a basic construction of the present invention.

FIG. 1 shows a basic construction of a control apparatus for a vehicle according to the present invention. In the figure, b1, b2, b3, b4 and b5 indicate a maximum acceleration calculating means, a correction coefficient calculating means, an acceleration resistance calculating means, a rolling and air resistance calculating means, and maximum driving force calculating means, respectively.

An embodiment of the present invention will be explained with reference to FIGS. 2 to 5.

Figure 2:
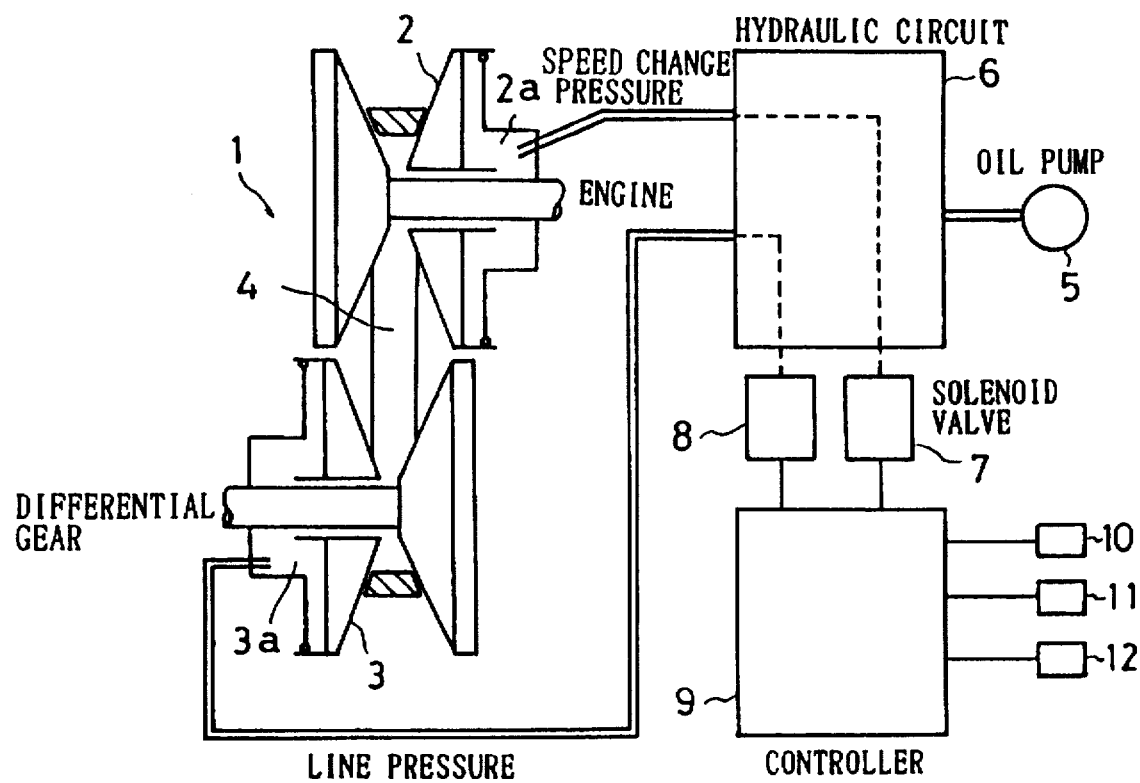
FIG. 2 is a system diagram showing an embodiment of the present invention.

FIG. 2 shows a system according to the embodiment of the present invention.

A continuously variable transmission (CVT) 1 has a primary pulley 2 connected to an engine, a secondary pulley 3 connected to a drive shaft (a differential gear), and a belt 4 extending around the pulleys 2 and 3. A speed change pressure applied to an actuator 2a connected to the primary pulley 2 and a line pressure applied to an actuator 3a connected to the secondary pulley 3 are adjusted to change a pulley ratio, to thereby continuously change a transmission speed change ratio. Any other CVT such as a toroidal CTV is employable.

A hydraulic pressure of the hydraulic circuit 6 connected to an oil pump 5 is controlled by solenoid valves 7 and 8 each having a relief function, to adjust the speed change pressure and line pressure. The solenoid valves 7 and 8 are controlled by a controller 9.

The controller 9 controls the solenoid valves 7 and 8, to control the speed change pressure and line pressure, to thereby control a transmission speed change ratio.

The controller 9 receives detection signals from a vehicle speed sensor 10 for detecting a vehicle speed VSP, a throttle sensor 11 for detecting a throttle opening TVO, and an engine rotation sensor 12 for detecting an engine rotational speed Ne. The vehicle speed sensor 10 serves as the unit for calculating the third value. The throttle sensor 11 has an idle switch, which is turned ON when a throttle valve is completely closed. A signal from the idle switch is also supplied to the controller 9.

Figure 3:
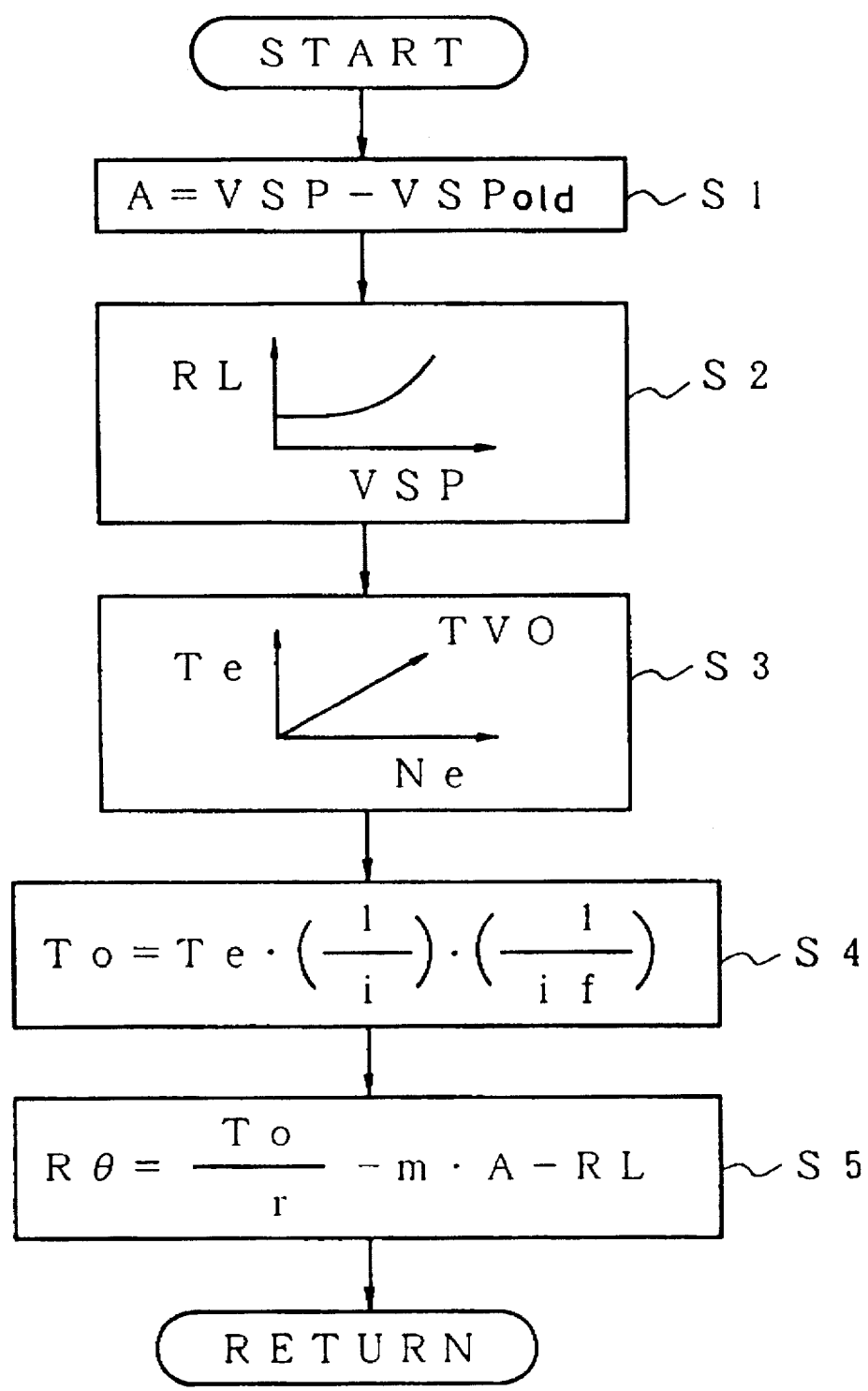
FIG. 3 is a flowchart showing a routine of calculating a hill-climbing resistance.
Figure 4:
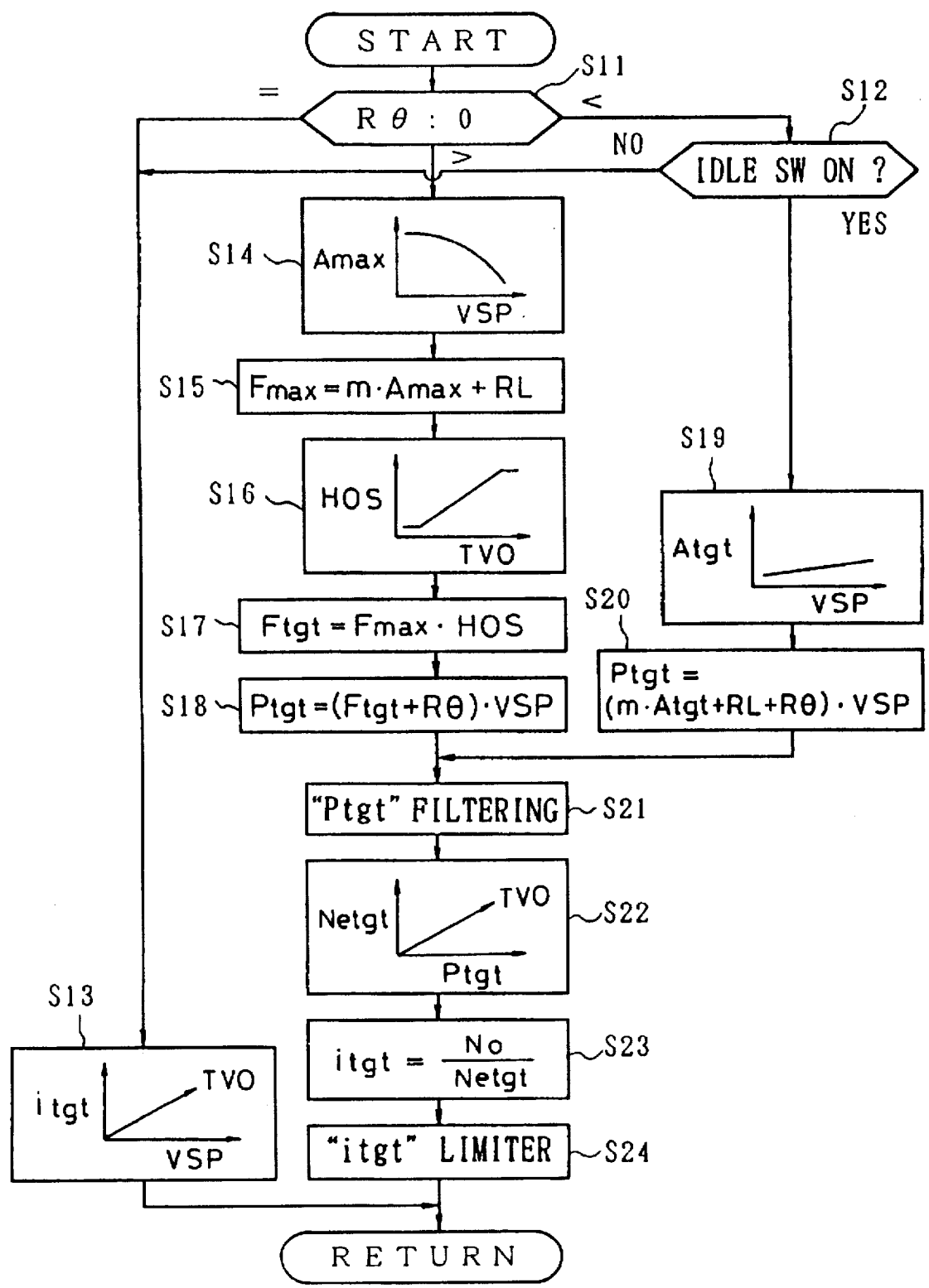
FIG. 4 is a flowchart showing a routine of setting a transmission speed change ratio.

According to these signals, a microcomputer incorporated in the controller 9 sets a target transmission speed change ratio "itgt" according to the flowcharts of FIGS. 3 and 4, and controls the solenoid valves 7 and 8 accordingly, to attain the target transmission speed change ratio.

FIG. 3 is a flowchart showing a routine of calculating a hill-climbing resistance. This routine corresponds to the unit for calculating the first value.

A principle of calculating the hill-climbing resistance will be explained.

The following equation is obtained from the equation of motion of a vehicle:

$$m \cdot A + RL + m \cdot g \cdot \sin\theta = T_o/r$$

where To is output torque, and r is the radius of a tire.

The hill-climbing resistance $R\theta = m \cdot g \cdot \sin\theta$ is calculated as follows:

$$R\theta = T_o/r - m \cdot A - RL$$

If the radius "r" of a tire and the mass "m" of the vehicle are constants, the hill-climbing resistance $R\theta = m \cdot g \cdot \sin\theta$ is obtainable according to the acceleration A, rolling and air resistance RL, and output torque To.

In step 1 (indicated with a prefix "s" as S1 in the figure) of FIG. 3, a vehicle speed VSP is read and an acceleration A=VSP−VSPold is calculated, where "VSPold" is the preceding vehicle speed.

In step 2, a rolling and air resistance RL is obtained from a map according to the vehicle speed VSP.

In step 3, engine torque Te is obtained from a map according to an engine rotational speed Ne and a throttle opening TVO.

In step 4, output torque To is calculated as follows according to the engine torque Te, a present transmission speed change ratio "i", which is obtained by dividing an output side rotational speed by an input side rotational speed, and the transmission gear "if" of a differential gear (the reciprocal of gear ratio):

$$T_o = T_e \cdot (1/i) \cdot (1/if)$$

In step 5, the hill-climbing resistance $R\theta(=m \cdot g \cdot \sin\theta)$ is calculated as follows according to the output torque To, acceleration A, and rolling and air resistance RL:

$$R\theta = T_o/r - m \cdot A - RL$$

where r is the radius of a tire, and m is the mass of the vehicle.

FIG. 4 shows a routine of setting a transmission speed change ratio.

In step 11, it is determined whether the hill-climbing resistance R$\theta$ is positive, negative or 0. If R$\theta$=0, i.e., the road is horizontal, control proceeds to step 13.

If R$\theta$>0, i.e., the road is uphill, control proceeds to step 14. If R$\theta$<0, i.e., the road is downhill, control proceeds to step 19 via step 12.

[Horizontal road with R$\theta$=0]

In step 13, according to the vehicle speed VSP and throttle opening TVO a map is referred to and a target transmission speed change ratio "itgt" is set to control the transmission to attain the target transmission speed change ratio.

[Uphill road with R$\theta$>0]

In step 14, a map is referred to according to the vehicle speed VSP and a maximum acceleration Amax to be achieved under a full throttle opening is obtained.

In step 15, a maximum driving force Fmax is calculated based on the maximum acceleration Amax and the rolling and air resistance RL, as follows:

$$Fmax = m \cdot Amax + RL$$

Here, the acceleration resistance m·Amax is calculated based on the maximum acceleration Amax and the mass "m" of the vehicle, and the maximum driving force Fmax is calculated by adding the rolling and air resistance RL to the acceleration resistance m·Amax.

In step 16, a correction coefficient HOS is obtained from a map according to the throttle opening TVO. The correction coefficient HOS is used to calculate a required driving force Ftgt for the present throttle opening from the maximum driving force Fmax under the full throttle opening. The correction coefficient HOS is set to 1 when the throttle valve is fully opened and approaches 0 as the throttle valve is closed.

In step 17, the maximum driving force Fmax for the full throttle opening is multiplied by the correction coefficient HOS corresponding to the present throttle opening, to provide the required driving force Ftgt as follows:

$$Ftgt = Fmax \cdot HOS$$

The steps 14 to 17 correspond to means for calculating the second value. In particular, step 14 corresponds to means for calculating a maximum acceleration, step 15 corresponds to means for calculating a maximum driving force having means for calculating an acceleration resistance, and step 16 corresponds to means for calculating a correction coefficient. Means for calculating a rolling and air resistance corresponds to the step 2 of FIG. 3.

Figure 5:
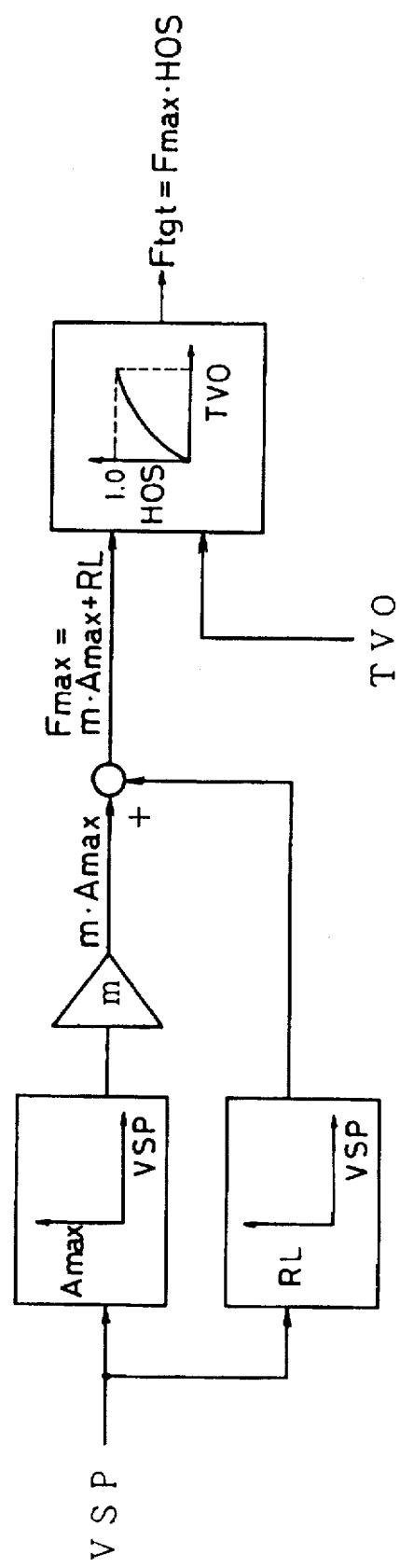
FIG. 5 is a block diagram showing a calculation of a required driving force.

FIG. 5 is a block diagram showing the calculation of the required driving force Ftgt.

After calculating the required driving force Ftgt, control proceeds to step 18.

In step 18, a target horsepower Ptgt is calculated as follows according to the required driving force Ftgt, hill-climbing resistance R$\theta$, and vehicle speed VSP:

$$Ptgt=(Ftgt+R\theta)\cdot VSP$$

The step 18 corresponds to means for calculating a target horsepower.

In step 21, filters the target horsepower Ptgt is filtered according to the following equations (1) and (2). Ptgt' provides a filtered target horsepower.

$$X_0 = A \cdot X_{-1} + B \cdot Ptgt \qquad (1)$$
$$Ptgt' = C \cdot X_0 + D \cdot Ptgt \qquad (2)$$

$$X = \begin{pmatrix} x_0 \\ x_1 \end{pmatrix} \quad A = \begin{pmatrix} a_0 & a_1 \\ a_2 & a_3 \end{pmatrix} \quad B = \begin{pmatrix} b_0 \\ b_1 \end{pmatrix}$$

$$C = (c_0 \; c_1) \quad D = (d)$$

The CVT continuously changes the speed change ratio thereof. Namely, the CVT may change the speed change ratio in response to even a small slope or a short change in slope. Accordingly, it is necessary to control the response of the CVT with respect to a slope or a target horsepower, so that it may not always change the speed change ratio. For this purpose, the embodiment employs a low-pass filter to filter the target horsepower Ptgt.

Alternatively, a moving average Ptgt' of the target horsepower may be calculated as follows;

$$Ptgt'=[(x-1)/x]\cdot Ptgt'+(1/x)\cdot Ptgt$$

where x is a weight constant.

In step 22, a map is referred to obtain a target engine rotational speed Netgt according to the filtered target horsepower Ptgt' and throttle opening TVO.

In step 23, calculates a target transmission speed change ratio "itgt" is calculated as follows according to the target engine rotational speed Netgt and output rotational speed No (the vehicle speed VSP):

$$itgt=No/Netgt$$

In step 24, a limiter process on the target transmission speed change ratio "itgt" is carried out to set an upper limit on the OD side. The upper limit is set according to the hill-climbing resistance Rq and vehicle speed VSP. As the hill-climbing resistance and vehicle speed VSP become larger, the upper limit of the target transmission speed change ratio "itgt" is more restricted.

The steps 21 to 24 correspond to means for controlling a transmission speed change ratio, i.e., means for controlling a horsepower.

[Downhill road with $R\theta<0$]

In step 12, it is determined whether or not the idle switch is ON, i.e., whether or not the throttle valve is completely closed. If the idle switch is OFF, it is determined that there is an intention to accelerate even on a downhill road. Accordingly, control proceeds to step 13 to carry out the control similar to the horizontal case.

If the idle switch is ON, control proceeds to step 19 where a required acceleration Atgt is set referring to a map according to the vehicle speed VSP. This required acceleration Atgt is close to zero.

In step 20, calculates a target horsepower Ptgt is calculated as follows according to the required acceleration Atgt:

$$Ptgt=(m\cdot Atgt+RL+R\theta)\cdot VSP$$

Thereafter, the steps 21 to 24 are executed similar to the uphill case.

These steps enable the vehicle to run on an uphill road at substantially the same throttle opening as on a horizontal road, always achieve proper engine braking on a downhill road of even a large slope, and maintain good driveability both on uphill one downhill roads.

Although the embodiment has been explained in relation to a continuously variable transmission whose speed change ratio is controlled to achieve a target horsepower, the present invention is also applicable to a stepwise transmission. Moreover, the quantity of intake air or an air-fuel ratio may be controlled to control a horsepower.

As explained above, according to the present invention, it is possible to drive a vehicle on an uphill road at substantially the same throttle opening as on a horizontal road, always achieving proper engine braking on a downhill road of even a large slope, and improving driveability. In this way, the present invention has great industrial applicability.

I claim:

1. A control apparatus for a vehicle having a drive system including an engine and a transmission arranged between the engine and an output drive shaft of the vehicle, comprising:

means for calculating a first value related to a hill-climbing resistance of the vehicle;

means for calculating a second value related to a driving force to be produced according to driving conditions of the vehicle;

means for calculating a third value related to the speed of the vehicle;

means for calculating a target horsepower according to the first, second, and third values; and means for controlling an operating parameter of the drive system of the vehicle to achieve the target horsepower.

2. The control apparatus according to claim 1, wherein said means for controlling the operating parameter controls the speed change ratio of the transmission to achieve the target horsepower.

3. The control apparatus according to claim 1, wherein said means for calculating the second value has:

means for calculating a maximum acceleration the vehicle can provide when the hill-climbing resistance thereof is substantially zero; and means for calculating a correction coefficient according to a parameter indicating an accelerator opening;

wherein said means for calculating the second value calculates the second value according to at least the maximum acceleration and correction coefficient.

4. The control apparatus according to claim 3, wherein said means for calculating the second value has:

means for calculating an acceleration resistance according to the maximum acceleration and mass of the vehicle;

means for calculating rolling and air resistance of the vehicle; and means for adding the acceleration resistance to the rolling and air resistance to provide a maximum driving force;

wherein said means for calculating the second value multiplies the maximum driving force by the correction coefficient to provide the second value.

5. The control apparatus according to claim 3, wherein said means for calculating the maximum acceleration calculates the same according to the third value.

6. The control apparatus according to claim 1, wherein said means for calculating the second value has means for determining whether the first value is positive or negative, and if the first value is negative, calculates the second value according to the third value.

* * * * *